Jan. 22, 1935. A. M. THOMSON 1,988,926
SEPARABLE FASTENER AND METHOD OF MAKING THE SAME
Filed Sept. 10, 1932
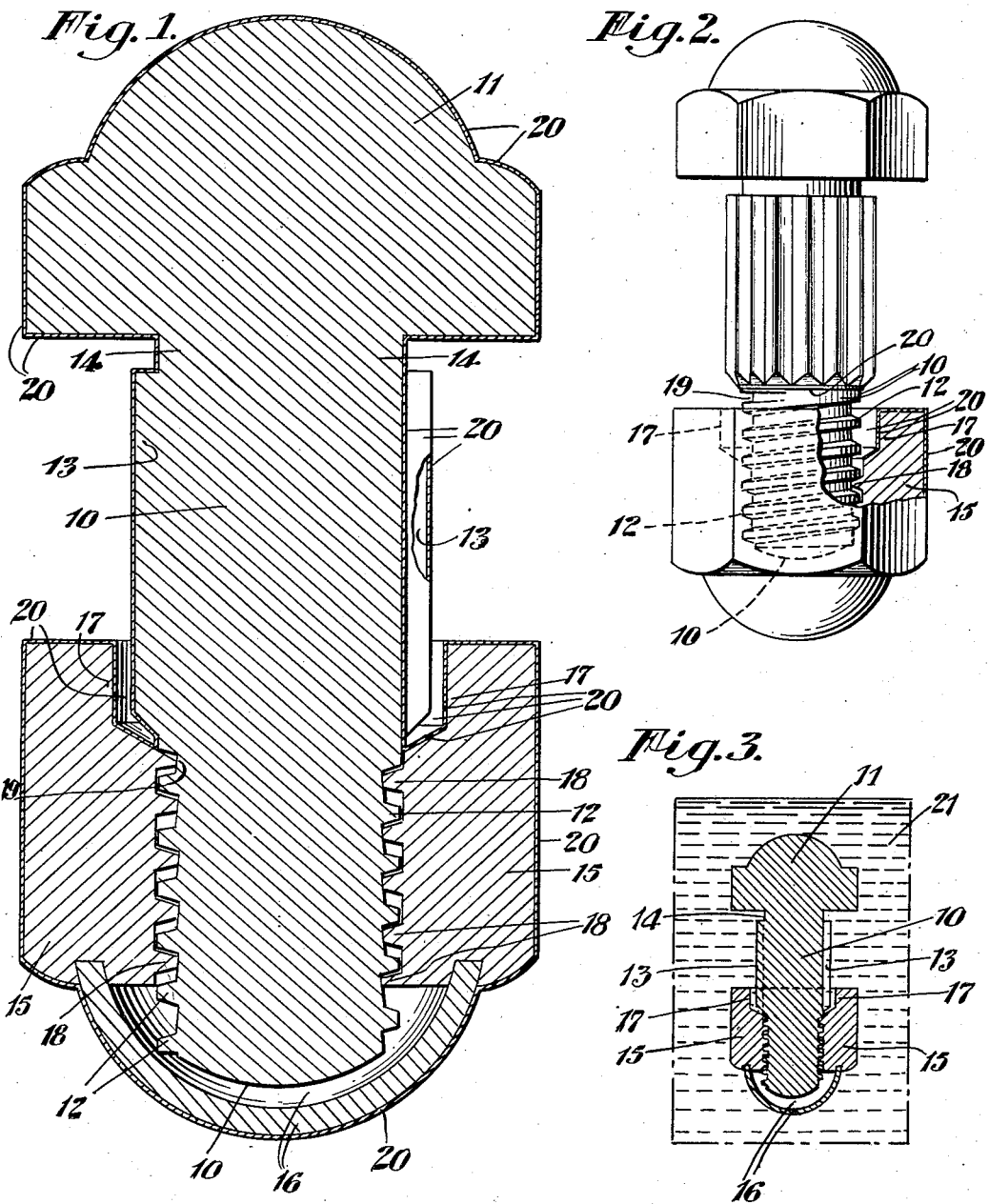
Inventor
ALFRED MORRIS THOMSON
By
Attorneys Patented Jan. 22, 1935

1,988,926

UNITED STATES PATENT OFFICE 1,988,926

SEPARABLE FASTENER AND METHOD OF MAKING THE SAME

Alfred Morris Thomson, East Orange, N. J., assignor to Dardelet Threadlock Corporation, New York, N. Y., a corporation of Delaware Application September 10, 1932, Serial No. 632,535

10 Claims. (Cl. 10—1)

This invention relates to improvements in separable fasteners of the kind comprising a bolt and a nut coupled by screw threads, and to improvements in methods of making such separable fasteners.

The invention has for its objects to provide for the protection of the thread connection between the nut and bolt prior to installation of the fastener; to provide an improved fastener of the nut and bolt type so constructed that it may be sold with its elements assembled and the threads coupling the elements enclosed and sealed against corrosion without coating the threads themselves; to provide an improved form of coated or galvanized fastener of the bolt and nut type having clean threads; to provide an improved galvanized or anti-corrosion coated bolt and cap nut and improved assemblies thereof for sale and shipment; and to provide improved methods of producing such improved fasteners and assemblies of fastener elements.

Other objects and advantages of the invention will appear from the following description of a preferred form of the fastener and method of producing the same shown in the accompanying drawing.

In the accompanying drawing, Fig. 1 is a longitudinal sectional view showing the assembled and coated or galvanized fastener at the finish of the coating or galvanizing operation thereon and in a condition in which it may be sold and shipped and remain until it is desired to install said fastener;

Fig. 2 is a side elevation of the coated or galvanized fastener, partly in longitudinal section, showing the nut partly unscrewed to rupture the coating envelope of the nut and bolt around the inner end of the threaded part of the bolt, which rupturing of the enveloping coating may be done immediately after the coating operation is completed and the coating has hardened or substantially hardened, or may only be done when it is desired to install the fastener; and Fig. 3 is a view showing the fastener elements assembled as in Fig. 1 and immersed in a bath of molten zinc or other suitable galvanizing or analogous coating material, the fastener being shown in longitudinal section as in Fig. 1 to more clearly indicate the surfaces accessible to the coating material and the surfaces inaccessible to said material.

While the improvements are illustrated and will be specifically described in connection with a separable fastener otherwise constructed as shown in my co-pending application Serial No. 632,534, filed September 10, 1932, they may be employed in connection with other forms of fasteners of the coupled bolt and nut type than that shown. As shown, the fastener comprises a metal bolt and a metal cap nut provided with and separably coupled by the well-known Dardelet self-locking screw threads.

The bolt has a shank 10 of round cross section provided at one end with a bolt head 11 and at its opposite end for a portion of its length with a bolt thread 12, said shank being enlarged in cross section from the inner end of its threaded portion substantially to the bolt head by integral longitudinally extending ribs 13 on the shank, which ribs preferably terminate just short of the bolt head so that the enlarged ribbed or longitudinally corrugated portion of the shank is joined to the bolt head by a very short neck portion 14 of the shank.

The nut is a cap nut whose body 15 has its axial bore closed at the head of the nut, as by a dome-shaped cap portion 16 of the nut, to form a bolt end receiving nut cavity. In the base portion of the nut, the nut bore or cavity is counterbored or enlarged in diameter for a portion of its length at the open end of the bore or cavity to provide a central cylindrical recess 17, and the unenlarged portion of the nut bore is screw threaded to provide a nut thread 18.

The internal diameter of the non-threaded and centrally recessed base portion of the nut thus provided is slightly greater than the maximum diameter of the enlarged ribbed portion of the bolt shank; the height of the nut is greater than the length of the threaded portion of the bolt shank; the height of the non-threaded base portion of the nut does not exceed (and is preferably less than) the length of the non-threaded portion of the bolt shank; and the threaded portion of the bolt shank is of such length as to permit it to be entirely enclosed within that portion of the nut cavity or bore which extends from the inner end of the recess 17 or open end of the threaded portion of the bore to the closed end of the bore, i. e. to be housed within the portion of the nut which extends between the closed head end of the nut and the leading end of the nut thread. The depth and diameter of recess 17 are thus such that the base portion of the nut may rotatively encompass the enlarged ribbed portion of the bolt shank for a substantial distance during screwing on of the nut before nut thread 18 is screwed up to the inner end of bolt thread 12, and preferably the length of the threaded portion of the shank and the distance from the leading end of the nut thread to the closed head of the nut or closed bottom of the nut cavity are such that the leading end of nut thread 18 will reach and bind in the usual imperfect terminal portion 19 of the thread groove of bolt thread 12 just before the tip of the bolt shank and the imperforate cap portion 16 of the nut can come into abutting engagement. This insures full mutual covering or housing of the thread connection by screwing on the nut as far as it will go and also insures a frictional binding together of the nut and bolt at the inner end of the coupled threads tending to resist accidental unscrewing of the bolt and nut. When the threads of the bolt and nut are, as shown, Dardelet self-locking threads, they may be partially interwedged throughout their length, as shown in Fig. 1, in thus fully screwing up the nut, to enhance the frictional grip of the nut on the bolt.

The improvements will now be described. After producing the two fastener elements above described and screwing up the nut fully and tightly on the bolt until the nut and bolt are in the coupled relation just above described and shown in Fig. 1, the fastener while so coupled is suitably treated for the prevention of rust and corrosion by giving all exposed surfaces thereof a relatively thin protective coating of suitable material which will be self-sustaining and will adhere to the fastener elements. Preferably the coating 20 is of a suitable metal or metallic alloy for resisting rust and corrosion, such as zinc or other well known metallic galvanizing materials. Preferably, also, the coating is applied to the fastener assembled as described by temporarily immersing the same in the well known way in a galvanizing bath 21 of molten zinc or other suitable material. Owing to the short period of treatment, the consistency of the coating material and the close fit around the line of junction at the inner end of the threaded portion of the bolt, the bath material will not flow appreciably beyond the said line of junction between the bolt and nut.

When removed from the bath, or after being otherwise coated, the assembled protected fastener will have an exterior protective and sealed envelope 20 of coating material extending over the bolt head and over the shank of the bolt from the bolt head to the inner end of the threaded portion of the shank, whence said envelope or coating continues unbroken over the walls of recess 17 and thence over the entire exterior of the nut, as shown in Fig. 1. The coating is allowed to cool and solidify.

The protected fastener thus produced may be sold and shipped while in the form just described and shown in Fig. 1, and the nut left fully screwed up thereon until it is desired to install the fastener. Or, the nut may be partly backed off to rupture the envelope 20 around the inner end of the threaded portion of the bolt shank, as shown in Fig. 2, and the nut then again fully screwed up into the position of Fig. 2 to protect the uncoated surfaces of the fastener, and particularly the screw threads, during shipment and any other interval prior to installation of the fastener. Obviously, if the fastener is marketed with the protective envelope unbroken as in Fig. 1, said envelope may be ruptured when it is desired to install the fastener by simply forcibly unscrewing the nut. When the fastener is installed, all uncoated surfaces are fully enclosed and protected.

In installing the fastener, the shank of the bolt is forced through apertures in the pieces to be fastened, which apertures are of a size intermediate those of the threaded and enlarged ribbed portions of the bolt shank, the ribs interlocking with the pieces which are clamped between the bolt head and the nut with the ribbed portion of the shank extending through the pieces and partly into the recessed base portion of the nut. The coating of zinc or other galvanizing material on the work piece abutting faces of the bolt head and nut assist in forming a tight seal around the bolt holes in the pieces.

It will be obvious that changes may be made. For example, the bolt shank need not be ribbed or headed, the bolt may be any form of bolt or analogous externally threaded member, the threads may be of any type, and the nut need not have a non-threaded and recessed base portion. Instead of coating the entire exposed surfaces of the bolt and cap nut after fully screwing the nut thread to the inner end of the bolt thread, the advantage of a clean and uncoated thread connection protected against dirt, rust and corrosion until it is desired to install the fastener, may be attained by merely flowing or otherwise applying any of the beforementioned rupturable coating materials or other suitable sealing material around and over the junction of the nut with the bolt shank at the inner end of the threaded portion of the bolt shank. It is also obvious that the coating need not necessarily be applied by immersing the fastener in the coating material.

A protected separable fastener is provided by the present invention which will have clean uncoated threads when installed; and whereby the well known disadvantages of coated threads, and the disadvantages and cost of production of coated threads re-cut to remove the coating therefrom, are avoided. By the present invention an improved simple and efficient method of producing separable fasteners having the advantages above pointed out is also provided.

What I claim is:

1. As an article of manufacture, a protected separable fastener comprising a screw threaded cap nut and a screw threaded bolt screwed together into an assembled relation in which the inner end of the threaded portion of the bolt and the outer end of the threaded portion of the nut meet, and a coating of corrosion resisting material adhering to those surfaces of the assembled bolt and nut which would otherwise be exposed, said coating forming a single unbroken envelope enclosing and sealing therewithin the assembled bolt and nut and adapted to be ruptured at the inner end of the threaded portion of the bolt by unscrewing the nut.

2. As an article of manufacture, a protected separable fastener as claimed in claim 1, wherein the threads of the assembled bolt and nut are releasably interwedged to threadlock the nut against accidental unscrewing from its assembled position on the bolt.

3. A protected separable fastener comprising a screw threaded bolt, and a screw threaded cap nut screwable on to the bolt to a maximum limit at which the cap nut entirely covers the peripheral and outer end surfaces of the threaded portion of the bolt and at which the leading end of the threaded portion of the nut is located at the inner end of the threaded portion of the bolt, said bolt and said cap nut each having those surfaces thereof which would otherwise be exposed when the cap nut is screwed on to the bolt to said limit coated with corrosion resisting material, and the remaining surfaces of the bolt and cap nut being uncoated.

4. As an article of manufacture, a protected separable fastener comprising a screw threaded bolt and a screw threaded cap nut screwed together into an assembled relation in which their threads are releasably frictionally locked on each other to prevent accidental unscrewing of the bolt and cap nut and in which the peripheral and outer end surfaces of the threaded portion of the bolt are entirely covered by the cap nut and the leading end of the threaded portion of the nut is located at the inner end of the threaded portion of the bolt, said bolt and said nut so assembled each having its exposed surfaces coated with corrosion resisting material and its remaining surfaces being uncoated.

5. An article of manufacture comprising a member having an internally threaded socket which is entirely closed at one end, a second member which is externally threaded and is screwed into said socket, said members being screwed together as far as they will go and being in an assembled relation in which their threads are unexposed, and a thin, metallic, corrosion resisting coating enveloping the two assembled members and adhering to and covering those surfaces of both members which would otherwise be exposed, said coating being rupturable by unscrewing the assembled members.

6. An article of manufacture consisting of a member having an internally threaded socket entirely closed at one end, and a second member having an externally threaded portion screwable into said socket to a maximum limit at which the threaded surfaces of both members are unexposed, each member having those surfaces thereof which would otherwise be exposed when the members are screwed together to said maximum limit coated with metallic corrosion-resisting material, the remaining surfaces of each member being uncoated.

7. A two-part, protected, separable fastener consisting of a threaded bolt and a threaded cap nut which are screwed together to the maximum possible extent and have those surfaces thereof which would otherwise be exposed covered with a coating of corrosion resisting material which completely envelops and seals therewithin the two-part assembly formed by the coupled bolt and cap nut.

8. A two-part, protected, separable fastener consisting of a threaded bolt and a threaded cap nut screwed together as far as they will go and having their threads releasably locked together to prevent accidental unscrewing of the bolt and nut, said assembled bolt and cap nut each having those surfaces thereof which would otherwise be exposed coated with corrosion resisting material, and the remaining surfaces of the bolt and nut being uncoated.

9. The method of making a galvanized separable fastener of the thread-coupled bolt and nut type having ungalvanized threads, which comprises forming a threaded bolt, forming a threaded cap nut for the bolt which will screw upon the bolt until the leading end of the threaded part of the nut reaches the inner end of the threaded part of the bolt and may there be thread-locked to the bolt, screwing the bolt and cap nut together into an assembled relation in which said ends of their threaded parts meet, thread-locking the bolt and cap nut together in said assembled relation, and galvanizing the assembled and thread-locked bolt and cap nut.

10. The method of making a protected separable fastener of the thread-coupled bolt and nut type having unprotected threads, comprising forming a threaded bolt, forming a threaded cap nut which will screw upon the bolt to a maximum limit at which the leading end of the threaded part of the nut and the inner end of the threaded part of the bolt meet and frictionally bind on each other, screwing the cap nut and bolt together to said maximum limit, galvanizing the assembled bolt and cap nut while they are screwed and bound together at said limit, backing off the nut to rupture the coating of galvanizing material around the said meeting ends of the threaded parts of the bolt and cap nut, and again screwing the bolt and cap nut together to said limit to bind the coated bolt and coated cap nut together against accidental unscrewing.

ALFRED MORRIS THOMSON.